United States Patent Office 3,847,835
Patented Nov. 12, 1974

3,847,835
PROCESS FOR MANUFACTURING A CATALYST, THE RESULTING CATALYST AND ITS USE IN A PROCESS FOR HYDROGENATING HYDROCARBONS
Jean Cosyns, Nanterre, France, assignor to Institut Francais du Petrole, des Carburants et Lubrifiants
Continuation-in-part of abandoned application Ser. No. 208,167, Dec. 15, 1971. This application May 1, 1973, Ser. No. 356,169
Claims priority, application France, Dec. 16, 1970, 7045509
Int. Cl. B01j *11/74*
U.S. Cl. 252—439
12 Claims

ABSTRACT OF THE DISCLOSURE

Process for manufacturing a catalyst used for selectively hydrogenating the unsaturated compounds contained in pyrolysis gasolines, comprising the successive steps of impregnating an alumina carrier with a nickel or cobalt soluble salt, drying and calcining, in the presence of air, the impregnated carrier, incorporating thereto a compound of a metal from group VIA and a nickel or cobalt compound, drying and calcining the resulting product and subjecting the same to sulfurization by means of a gas stream containing hydrogen sulfide.

---

Figure 1:
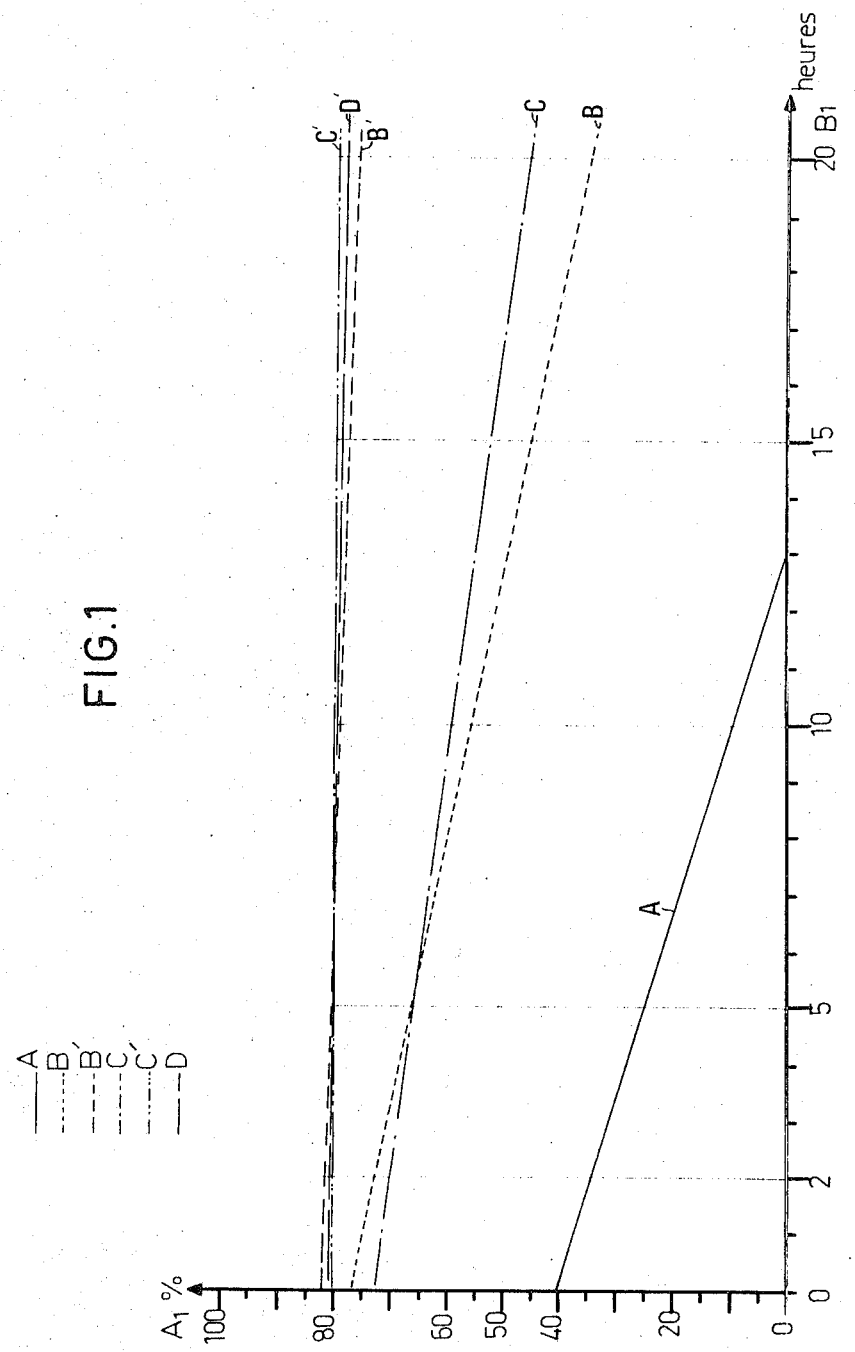

This application is a continuation-in-part of my copending application S.N. 208,167, filed Dec. 15, 1971, now abandoned.

The present invention relates to a process for manufacturing a catalyst which can be used, in particular, in a process for selectively hydrogenating pyrolysis gasolines, rich in sulfur compounds and particularly in acid sulfur compounds such as thiols, this catalyst comprising at least one metal from group VIII and one metal from group VIA, deposited on a carrier of transition alumina.

It is known that the pyrolysis products such as for example gas-oils, kerosenes and particularly pyrolysis gasolines, i.e. the gasolines produced from steam cracking coking, visbreaking units and the like, contain highly unsaturated compounds such as for example, diolefinic and styrenic gum-forming hydrocarbons, such gasoline being relatively unsuitable for any subsequent use. A certain number of these gasolines such as those obtained from coking, visbreaking and steam cracking of heavy cuts such as for example gas-oils, have high contents of sulfur compounds (up to 5,000 p.p.m. as calculated as sulfur weight), a non negligible proportion of these substances being in the form of mercaptans (in some cases up to about 1,000 p.p.m.).

Generally, the various pyrolysis gasolines are improved by selectively hydrogenating the diolefinic and styrenic compounds. Numerous processes have been described for the treatment of gasolines produced by the steam cracking of naphtha, said gasolines having a total sulfur content scarcely exceeding 1,000 p.p.m. whereas the content of acid sulfur never exceeds 50 p.p.m. Such processes, which make use generally of nickel or palladium catalysts are improper for treating gasolines rich in sulfur of the mercaptan type. U.S. Pat. 3,472,763 discloses using catalysts comprising a metal of group VIII and a metal of group VIA acting in the sulfurized state. These catalysts, generally used in the hydrogenation of gasolines rich in acid sulfur, however, are less active and less stable than the corresponding nickel or palladium catalysts used in the hydrogenation of gasolines, produced by steam cracking, having a low acid sulfur content.

It is an object of this invention to provide a catalyst for hydrogenating pyrolysis gasolines rich in acid sulfur, i.e. having a mercaptan content higher than 50 p.p.m. by weight, under conditions (particularly low temperature) as mild as those used with steam cracking gasolines having only a low acid sulfur content and with substantially equal operating times.

For manufacturing the catalyst according to this invention, use is made of a carrier consisting of a transition alumina, for example in the form of balls, extrudates, crushed fragments, pills etc., having a specific surface between 120 and 500 m.$^2$/g. and preferably between 150 and 400 m.$^2$/g. and a total pore volume between 0.2 and 0.9 cc./g. and preferably from 0.4 to 0.8 cc./g. This alumina is then impregnated by means of a solution of a nickel or cobalt soluble salt selected for example among the nitrates, chlorides, formates etc. . . . so as to obtain an impregnated carrier having from 2 to 10% by weight of nickel or cobalt calculated as oxide. The resulting solid is then dried and calcined in the presence of air, for example under air atmosphere or in a current thereof, at a temperature advantageously in the range of from 700 to 850° C., for example during 1 to 6 hours. After cooling, there is incorporated therein in any convenient way, for example by impregnation, mixing or coprecipitation, a compound, for example, a salt of nickel or cobalt, such as for example a nickel or cobalt nitrate or formate as well as a compound, for example a salt, of a metal from group VIA such as, for example, an ammonium molybdate or tungstate. The total percent by weight of the metal oxides deposited during the two first stages (NiO, CoO+MoO$_3$ or WO$_3$) is preferably between 5 and 30%. The relative proportions of the oxides of metals from groups VI and VIII introduced during the second step are preferably as follows: for the oxides of group VIII metals, from 10 to 50% by weight, for the oxides of group VI A metals, from 50 to 90% by weight. In the second step of the process, the two salts can be incorporated simultaneously or successively. The so-obtained catalyst is then dried and calcined at a temperature of from, for example, 400 to 600° C. In order to be used for the hydrogenation, the catalyst must be further subjected to a sulfurization step which is generally carried out in situ. This pretreatment can be achieved by using a gas stream containing, in addition to the hydrogen, and/or an inert gas such, for example, as nitrogen or methane, from 1 to 10% by volume of hydrogen sulfide, at a temperature between 200° C. and 500° C., during a sufficient time for converting at least the major part of the dioxides of metals from groups VIII and VIA to the corresponding sulfides, i.e. for example NiO and CoO to Ni$_3$S$_2$ and C$_9$S$_8$ and MoO$_3$ and WO$_3$ to MoO$_2$ and WS$_2$.

The finished catalyst will have a specific surface generally lower than the starting alumina. The specific surface of the finished catalyst is preferably between 120 and 300 m.$^2$/g. The operating conditions for the hydrogenation are so selected as to insure a substantially complete hydrogenation of the diolefines and styrenes while avoiding the polymerization and the deposit of the gums formed by the latter. The total pressure is generally from 20 to 60 kg./cm.$^2$; the temperature from 50 to 250° C., the VVH (spatial velocity=hourly flow rate by volume per volume unit of catalyst) from 0.5 to 5 and preferably from 1 to 2.5 and hydrogen flow rate with respect to the charge is from 0.2 to 2 moles per mole of liquid charge. The catalyst is used in one or more fixed beds. The operating conditions, as apparent, provide for the maintenance of the major part of the charge in the liquid phase, resulting in a better washing of the gums which may be present in the gasoline or in some cases formed in the reactor.

The following non-limitative examples illustrate the present invention:

EXAMPLE 1

Six catalysts have been prepared according to the following methods:

Catalyst A—To a carrier of transition alumina having a specific surface (BET) equal to 250 m.²/g. and a total pore volume of 0.6 cc./g., there are incorporated 20% by weight of nickel oxide by impregnation with an aqueous solution of nickel nitrate. The catalyst is then dried and calcined at 500° C. for two hours. It is thereafter treated with a current of $H_2S$ diluted with 2% by volume of hydrogen, at a temperature of 300° C. during 5 hours.

The resulting catalyst has a specific surface of 200 m.²/g.

Catalyst B—To the same carrier as that of catalyst A, there are incorporated 10% by weight of NiO and 10% by weight of $MoO_3$ by impregnation with a mixture of nickel nitrate and ammonium paramolybdate in solution. The catalyst is then dried, calcined and sulfurized in the same manner as catalyst A. Its specific surface is 190 m.²/g.

Catalyst B'—To the same carrier as that of catalysts A and B, there are incorporated 5% by weight of NiO by impregnation with a solution of the nitrate; the impregnated carrier is then dried and calcined at 800° C. for 2 hours. It is allowed to cool and the same subsequent treatment as for catalyst B is used, i.e. there is further incorporated thereto 5% by weight of NiO and 10% by weight of $MoO_3$ and the catalyst is calcined, dried and sulfurized as above mentioned. Its specific surface is 195 m.²/g.

Catalysts C and C' are prepared in the same manner as catalysts B and B' except that the incorporated molybdenum oxide $MoO_3$ is replaced by 8.5% by weight of tungsten oxide $WO_3$. The impregnation is carried out from nickel and ammonium paratungstate. The specific surfaces of catalysts C and C' are respectively 226 m.²/g. and 201 m.²/g.

Catalyst D is prepared in the same manner as catalyst C', except that during the first impregnation, 5% by weight of cobalt oxide (CoO) are incorporated instead of the nickel oxide. Its specific surface is 200 m.²/g.

In order to test the activity and the stability of these various catalysts there is used an accelerated ageing test which is performed in the following manner:

The charge to be hydrogenated contains isoprene diluted in benzene in a molar proportion of 10%. In order to measure the resistance of the catalyst to mercaptans, ethylmercaptan is added in a proportion of 1000 p.p.m. calculated as sulfur weight. The operating conditions are as follows:

| | |
|---|---|
| Temperature | 100° C. |
| Pressure | 50 bars. |
| VVH (volume of the charge/volume of the catalyst/h.) | 6. |
| $H_2$/carge (inlet of the reactor) | 1 mole/mole. |

The test is continued over about 20 hours. The results are given in Table 1.

TABLE 1

| Catalysts | Percent conv. of isoprene after— | | | | |
|---|---|---|---|---|---|
| | 2 hrs. | 5 hrs. | 10 hrs. | 15 hrs. | 20 hrs. |
| A | 34.5 | 25.1 | 9.6 | (1) | (1) |
| B | 72.9 | 66.6 | 56.0 | 45.3 | 35.0 |
| B' | 81.7 | 80.8 | 78.9 | 77.5 | 76.1 |
| C | 70.2 | 65.9 | 59.0 | 52 | 45.1 |
| C' | 80.5 | 80.35 | 80 | 79.8 | 79.4 |
| D | 80.8 | 80.3 | 79.5 | 78.6 | 78.1 |

[1] Undetectable.

On the accompanying FIG. 1 the ordinates ($A_1$) indicate the conversion percent of isoprene as a function of the duration of the test in hours. It can be observed that the catalyst prepared according to the invention (B', C', D) have both a satisfactory activity and a good stability.

EXAMPLE 2

This example relates to the treatment of a gasoline produced from a coking unit and whose main characteristics are given in the following table:

| Analyses | Units | Results |
|---|---|---|
| Specific weights at 15° C | G./ml | 0.788 |
| Actual gums after washing with heptane | Mg./100 ml. | 144 |
| Induction period | Mn | 67 |
| Bromine number | G. $Br_2$/100 g. | 116 |
| Maleic anhydride value (MAV) | Mg. MA/g. | 53 |
| Distillation ASTM | ° C. | |
| Initial point | | 74 |
| 50% | | 142 |
| Final point | | 240 |
| Total sulfur | G./100 g. | 1.13 |
| Mercaptan sulfur | P.p.m. | 380 |
| Doctor test | | Positive |
| Octane number research: | | |
| (RON) clear | | 78 |
| (RON) with 0.5% ethyl content | | 82 |

As it is apparent, this gasoline is unsuitable for any further use. It cannot be used as motor gasoline since it is too rich in diolefines, in total sulfur and in mercaptan sulfur. Moreover, it has a low octane number. This gasoline is generally subjected, in order to increase its value, to various hydrogenation and desulfurization treatments followed by a reforming step. In a first step, it is necessary to hydrogenate the diolefines as completely as possible in order to obtain a suitable charge for the subsequent hydrodesulfurization.

This treatment is conducted under the following conditions:

T=150° C.
VVH=2
P=50 kg./cm.².
$H_2$/charge=1 mole/mole.

In this example, the catalysts B, C on the one hand and B', C' and D on the other hand are compared from the point of view of their activity and their stability. The operation is conducted by maintaining the same conditions during about 200 hours.

The activity is measured by the percent decrease of the MAV.

$$\frac{\text{MAV of the charge} - \text{MAV of the product}}{\text{MAV of the charge}} \cdot 100$$

The obtained results are summarized in Table 2.

TABLE 2

| Catalysts | MAV Ch | Time | | | | | | | | |
|---|---|---|---|---|---|---|---|---|---|---|
| | | 20 hrs. | | 50 hrs. | | 100 hrs. | | 150 hrs. | | 200 hrs. | |
| | | $MAV_p$[1] | Percent conv.[2] | $MAV_P$ | Percent conv. | $MAV_P$ | Percent conv. | $MAV_P$ | Percent conv. | $MAV_P$ | Percent conv. |
| B | 53 | 11.05 | 78.2 | 13.65 | 74.2 | 17 | 68 | 21.5 | 61.3 | 24.05 | 54.6 |
| B' | 53 | 6.0 | 88.8 | 6.3 | 88.1 | 7.05 | 86.8 | 7.6 | 85.7 | 8.3 | 84.4 |
| C | 53 | 12.6 | 76.3 | 13.95 | 73.7 | 16.2 | 69.4 | 18.45 | 65.1 | 20.8 | 60.8 |
| C' | 53 | 10.1 | 81 | 10.2 | 80.8 | 10.45 | 80.4 | 10.6 | 80 | 10.8 | 79.7 |
| D | 53 | 10.2 | 80.7 | 10.4 | 80.5 | 10.6 | 80 | 10.9 | 79.5 | 11.1 | 79.1 |

[1] MAV are the initials of maleic anhydride value, this value being expressed in mg. MA/g.
[2] Percent conversion indicates the percent conversion of diolefines.

Figure 2:
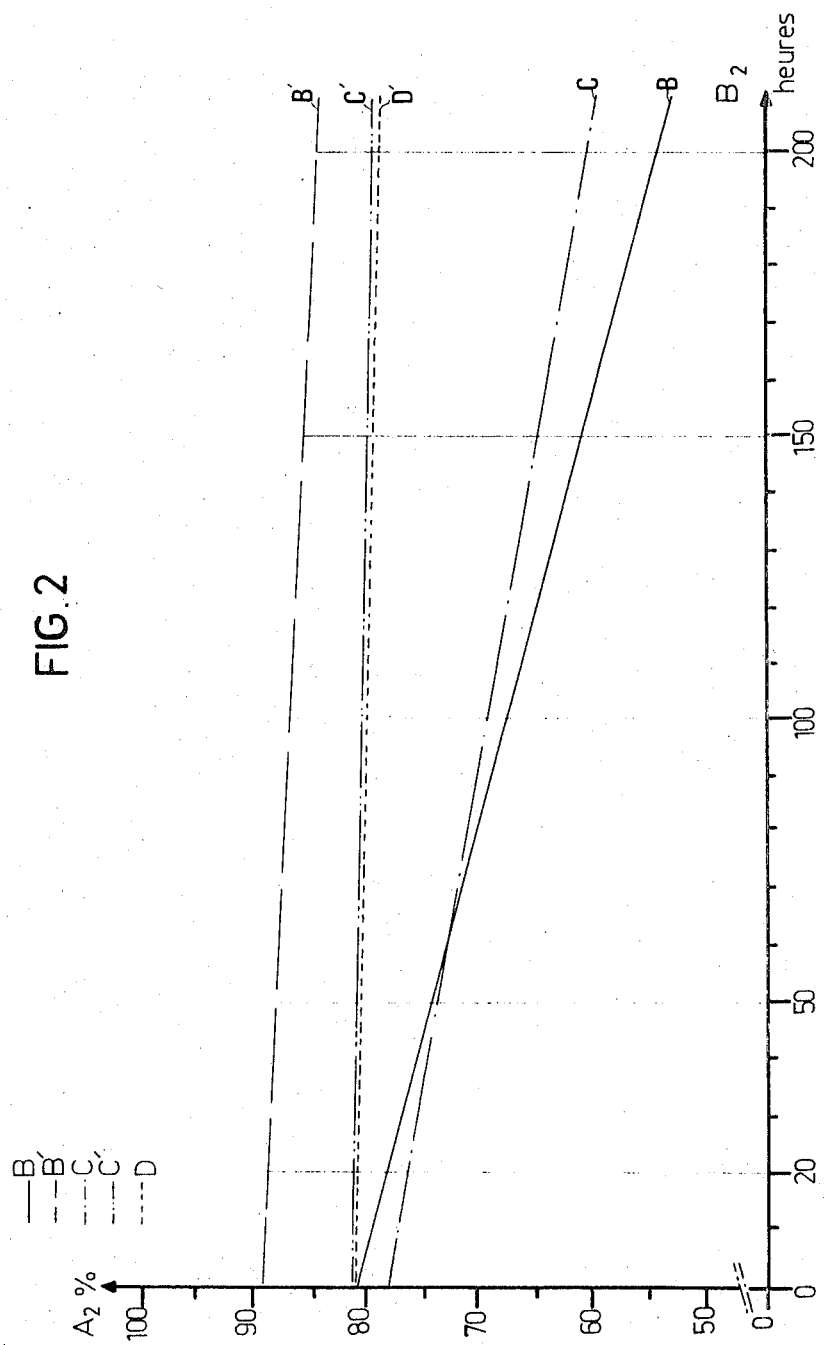

In the accompanying FIG. 2 the ordinates ($A_2$) indicate the percent conversion of diolefines and the abscissae ($B_2$) the time in hours. It may be observed that the catalysts prepared according to the invention have a better activity and a much better stability than the known catalysts.

EXAMPLE 3

This example relates to the treatment of a gasoline produced from a steam cracking of gas oil. Its main characteristics are summarized in the following table:

| Analyses | Units | Results |
|---|---|---|
| Specific weight at 15° C | G./ml | 0.848 |
| Actual gums after washing with heptane | Mg./100 ml | 30 |
| Induction period | Mn | 60 |
| Bromine number | G. $Br_2$/100 g | 65 |
| Maleic anhydride value | Mg. MA/g | 95 |
| Distillation ASTM: | ° C. | |
| Initial point | | 35 |
| Final point | | 205 |
| Total sulfur | G./100 g | 0.30 |
| Mercaptan sulfur | P.p.m | 150 |
| Clear RON | | 99 |
| RON with a 0.5% ethyl content | | 101 |
| Composition | Percent pds. | |
| Aromatics plus styrene compounds | | 69 |
| Paraffins | | 4 |
| Olefins | | 9 |
| Diolefins | | 7 |
| Cyclodiolefins | | 6.5 |
| Naphthenes | | 4.5 |
| Total | | 100.0 |

Since it is desired to obtain a gasoline suitable for use as motor gasoline, or as base charge for the production of aromatics, it is necessary to remove the diolefins and the styrene compounds as completely as possible.

The treatment is conducted in the following conditions:

T=155° C.
VVH=1.5
P (total)=50 kg./cm.$^2$
$H_2$/charge=0.6 mole/mole
Partial pressure $H_2$=20 kg./cm.$^2$ In this example, there has been determined the temperature necessary for obtaining a MAV of the product lower than 5. In this case the more active and more stable catalysts are those catalysts permitting lower operating temperatures and lower temperature increases during the cycle. The following results obtained with various catalysts have been collected in the following Table 3.

TABLE 3

| | Operating time of the reactor | | | | | |
|---|---|---|---|---|---|---|
| | 50 hrs. | 100 hrs. | 200 hrs. | 400 hrs. | 1,000 hrs. | 2,000 hrs. |
| Mean temperature of the reactor (° C.) for catalyst: | | | | | | |
| B | 162 | 165 | 169 | 176 | 190 | 208 |
| B' | 153.5 | 156 | 160 | 165 | 172 | 178 |
| C | 168 | 170 | 174 | 178 | 187.5 | 199 |
| C' | 150.5 | 154 | 158 | 161 | 165 | 168.5 |
| D | 151 | 155 | 158.5 | 162 | 166 | 171 |

Figure 3:
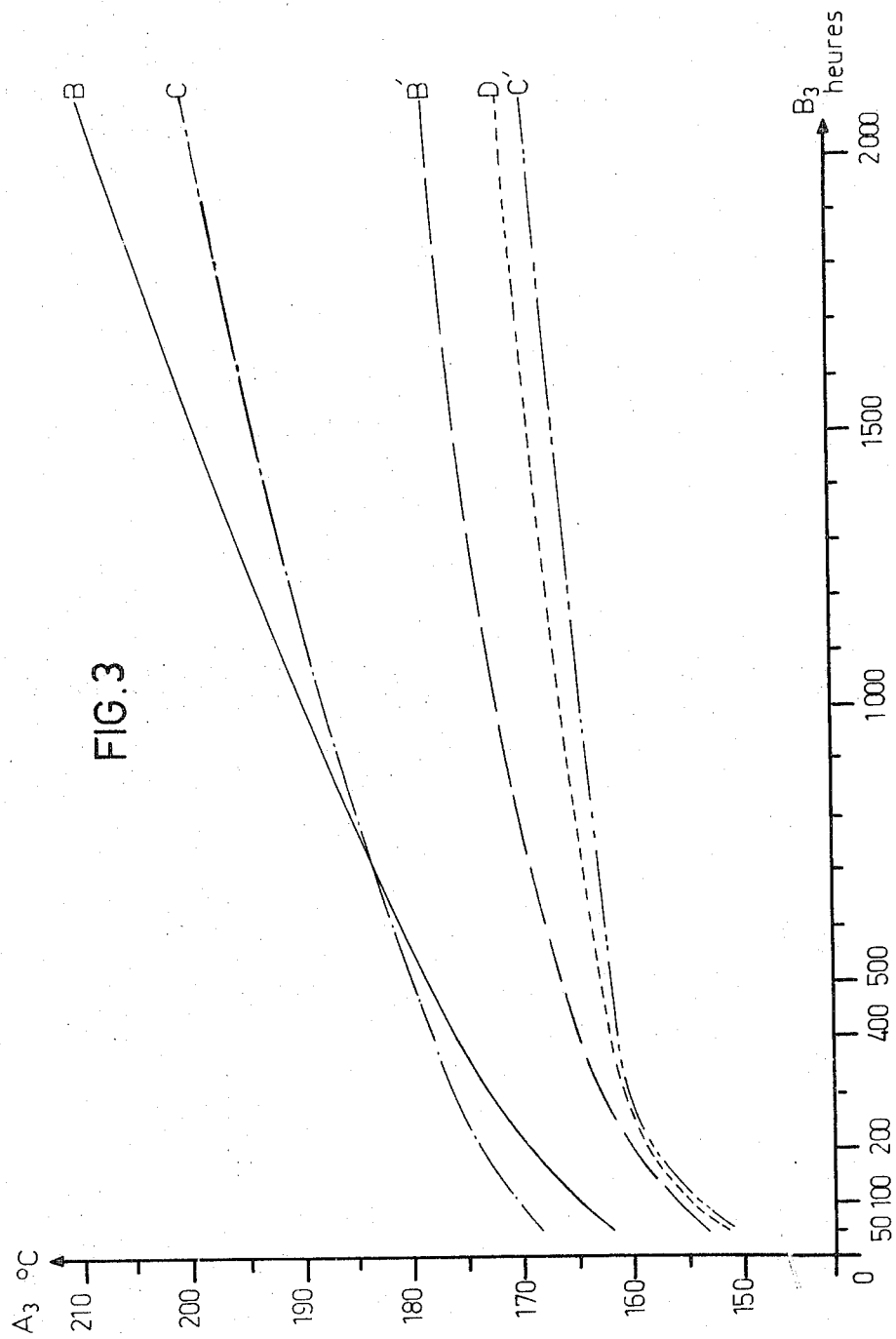

On the accompanying FIG. 3, the ordinates ($A_3$) indicate the mean temperature in ° C. of the reactor required for the elimination of the diolefins and the abscissae ($B_3$) indicate the operation time of the reactor in hours.

As in Example 2, it is observed that the catalysts prepared according to the invention are the most active and the most stable.

What is claimed is:

1. In a process for manufacturing a catalyst consisting essentially of an alumina carrier having a specific surface of 120–500 m.$^2$/g. and a pore volume of 0.2–0.9 cc./g. nickel sulfide or cobalt sulfide, and a sulfide of a group VIA metal, said sulfides being present in catalytic amounts, which process comprises impregnating the alumina carrier with a solution of compounds of said metals which form metallic oxides upon calcining; calcining the impregnated carrier; and sulfiding resultant calcined catalyst with a gas containing hydrogen sulfide, the improvement in said impregnating and calcining steps of: (1) impregnating said catalyst with a solution consisting essentially of a nickel or cobalt compound capable of forming an oxide upon calcining, drying and then calcining the impregnated product in the presence of air at 700–850° C.; and (2) impregnating resultant calcined product from step (1) with a solution consisting essentially of catalytic quantities of (a) a nickel of cobalt compound capable of forming an oxide upon calcining and (b) a compound of a group VIA metal capable of forming an oxide upon calcining, drying and then calcining the resultant impregnated product in air at 400–600° C., the amount of nickel or cobalt oxide incorporated in the carrier in the first step being sufficient to improve the stability of the catalyst so that the combination of steps (1) and (2) yields a catalyst having a higher stability during hydrogenation of diolefins than a corresponding catalyst prepared without the first high temperature calcining step.

2. A process according to claim 1 wherein during the step (1), nickel or cobalt is incorporated in the catalyst in such an amount that the solid obtained at the end of the first step has a nickel or cobalt content from 2 to 10% by weight expressed as oxide.

3. A process according to claim 1, wherein the treatment with hydrogen sulfide in the sulfiding step is conducted at a temperature between 200 and 500° C.

4. A process according to claim 1 wherein, during the step (2), the metal of group VIA and nickel or cobalt are incorporated to the carrier by impregnation with solutions of salts of these metals.

5. A process as defined by claim 1 wherein the first calcining step is conducted for 1–6 hours.

6. A process according to claim 2, wherein during the step (2), the nickel or cobalt compound and the compound of a group VIA metal are incorporated in the catalyst in the relative proportions of 10–50% by weight of nickel or cobalt expressed as oxide, and 50–90% by weight of group VIA metal, expressed as oxide, the total incorporation of metal compounds during the steps (1) and (2) being 5–30% by weight, expressed as oxide.

7. A process according to claim 6, wherein the metals of the incorporated compounds are nickel during the step (1) and nickel and tungsten during the step (2).

8. A catalyst manufactured according to the process of claim 1, wherein the total content of catalytic metals, expressed as oxides, is from 5 to 30% by weight of the catalyst.

9. A catalyst according to claim 8, wherein cobalt and nickel, expressed as oxides, correspond to 10 to 50% by weight and the metals of the group VIA, expressed as oxides, correspond to 50 to 90% by weight, of the total content of catalyst metals.

10. A catalyst according to claim 8, having a specific surface of from 120 to 300 m.$^2$/g.

11. A catalyst according to claim 8, wherein the alumina carrier has a specific surface of from 150 to 400 m.$^2$/g. and a pore volume of from 0.4 to 0.8 cc./g.

12. A catalyst according to claim 8, wherein the metal of group VIA is selected from the group consisting of molybdenum and tungsten.

References Cited
UNITED STATES PATENTS

| | | | |
|---|---|---|---|
| 3,114,701 | 12/1963 | Jacobson et al. | 252—439 X |
| 3,184,404 | 5/1965 | Flinn et al. | 252—439 X |
| 3,006,970 | 10/1961 | Beuther et al. | 252—439 X |

PATRICK P. GARVIN, Primary Examiner

U.S. Cl. X.R.

205—255 H